Feb. 25, 1936. G. H. WOTRING 2,032,245
FLOW METER
Filed Feb. 15, 1935
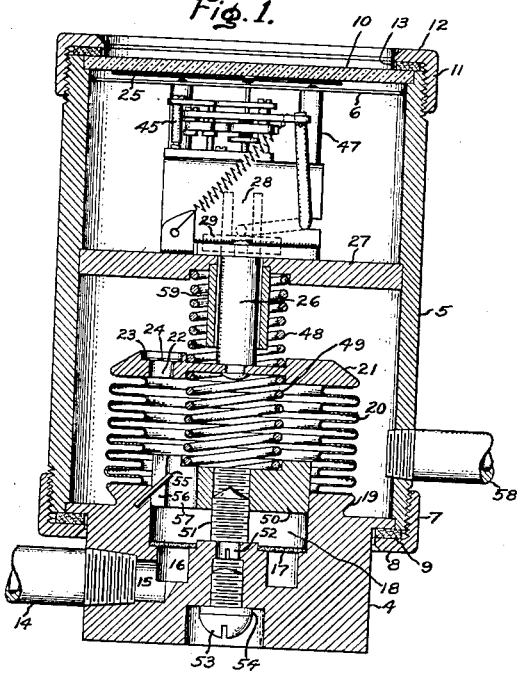
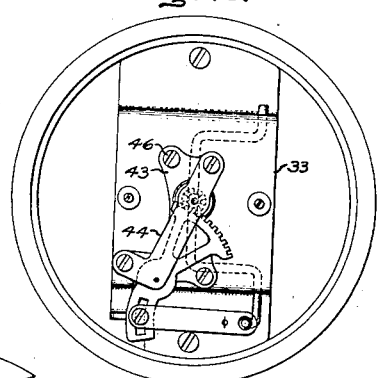
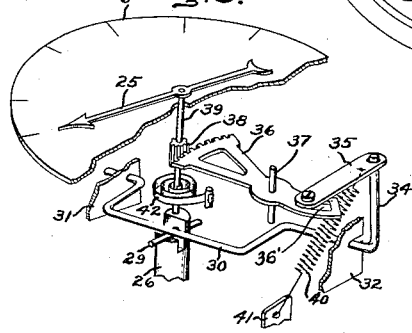
Inventor:
Gaylord H. Wotring,
by Harry E. Dunham
His Attorney.

Patented Feb. 25, 1936

2,032,245

UNITED STATES PATENT OFFICE 2,032,245

FLOW METER

Gaylord H. Wotring, Scotia, N. Y., assignor to General Electric Company, a corporation of New York Application February 15, 1935, Serial No. 6,741

1 Claim. (Cl. 73—167)

My invention relates to flow meters and more particularly to a flow-rate indicating instrument for determining the rate of oil feed to oil burners.

One object of my invention is to provide a portable measuring device which will indicate accurately and retain its accuracy independent of oil line pressure.

Another object of my invention is to provide an improved zero adjustment for such instruments.

Another object of my invention is to provide a portable instrument in which the oil remaining in the instrument after each use is prevented from soiling the dial.

For a better understanding of my invention, together with other and further objects thereof, reference is had to the following description, taken in connection with the accompanying drawing, and its scope will be pointed out in the appended claim.

In the accompanying drawing, Fig. 1 is a vertical cross-section of an instrument built in accordance with my invention; Fig. 2 is a top view of the connection between the operating mechanism and the indicating mechanism, and Fig. 3 is a perspective view of the indicating mechanism.

Referring to Fig. 1 in detail, the instrument comprises a base 4, a casing 5 and a dial 6. The base is secured to the casing by a collar 7, which is threaded on to the casing and by means of a flange 8 draws the base against the end of the casing 5. A gasket 9 seals this joint against atmospheric variations. A glass cover 10 over the dial 6 is similarly secured by a flanged collar 11 whose flange 12 draws the cover against the upper end of the casing 5 and a gasket 13 seals this end of the casing against atmospheric pressure variations.

The base 4 contains an inlet pipe 14 connected in a passage 15 which opens into an annular groove 16 on the inner side of the base. The groove 16 is covered by an oil screen 17 which separates this groove from an enlarged concentric bore 18 in the base 4. The upper end of the bore 18 is surrounded by a flange 19 projecting above the base 4 and to the surface of this flange one end of a bellows 20 is rigidly secured. The securing may be accomplished in any suitable manner, such as soldering or brazing if, as in the present case, the bellows is of metal. The important factor is to obtain a fluid-tight joint. The bellows in the present instance is of metal, such as brass. It may be made of other material depending upon the fluid which is to be measured. It must be understood that my invention is applicable to the measurement of any fluid and may be so adapted by properly proportioning the area and resiliency of the bellows and the diameter of the metering orifice.

The upper end of the bellows is closed by a disc 21 having therein an outlet opening 22 which in turn is closed by a thin metallic disc 23 having therein an orifice 24 which is properly proportioned to pass the fluid which is to be measured. Its size determines the back pressure which is built up in the bellows during operation and thereby the maximum quantity of fluid which may flow through the instrument within the deflection range of the pointer. The disc 21, as stated above, closes the top of the bellows and its movement is transmitted to a pointer 25 through linkage mechanism shown in Fig. 3.

The disc 21 is provided with a shaft or pushrod 26 projecting upwardly from the center of the disc through a partition 27 in the casing 5. It is provided at its upper end with a slot 28 and a pin 29 projecting through holes in the shaft at right angles to the slot. This pin 29 is placed a predetermined distance above the partition 27 when the disc 21 is in its normal position. When the bellows collapses the predetermined amount which is considered safe, the pin engages the partition and prevents any further movement in that direction. In the slot 28 rests a crank 30 which is pivoted in the vertical walls 31 and 32 of a channel-shaped supporting member 33. The crank 30 is provided with a vertical arm 34. A link 35 attached to the upper end of this arm 34 is attached to gear segment 36 pivoted on pin 37. The connection between the link 35 and the gear segment 36 is made adjustable by providing an arcuate slot 36' in the gear segment at any point of which the link 35 may be fastened. The point at which the link 35 is fastened to the gear segment determines the full scale movement of the pointer 25. The gear segment 36 engages a pinion 38 mounted on the pointer shaft 39. When the crank 30 is moved upwardly the link 35 is moved against the tension of a spring 40 attached to the link 35 and to an ear 41 on the support 33. The shaft 39 is moved against the tension of a helical spring 42. The pivot pin 37 and pointer shaft 39 are pivoted on a bearing frame member 43 and in another bearing frame member 44. These frame members are spaced from each other by spacing screws 45 and are attached to the support 33 by screws 46. The dial 6 is supported above member 33 by spacing screws 47.

In instruments of this type it is difficult to obtain a return of the pointer to a predetermined zero position. This is due to the fact that when the load on the bellows approaches zero there is very little positive force tending to return the disc 21 to its original position. I overcome this difficulty by providing two opposing springs 48 and 49 which are under a substantial initial pressure when the disc 21 is in its normal zero position. The spring 48 is mounted between the disc 21 and the partition 27. The spring 49 is mounted inside of the bellows 20 between the disc 21 and an adjustable block 50. The block 50 is a circular block mounted in the bore 18. It may be raised or lowered by a screw 51, the head 52 of which projects into a hole in the base 4. This hole is normally sealed by a screw 53 and a gasket 54. By removing this screw the block 50 may be adjusted from outside of the casing by simply turning the head 52. The block is prevented from turning by a pin 55, projecting into a slot 56 milled into the block between its edge and a hole 57 through which oil flows from the bore 18 into the bellows 20.

Before operation the block 50 is raised about half of its travel. The initial length of the springs 48 and 49 is such that they are both under a substantial compression in any position of the block 50 after they are assembled in the instrument. With that arrangement the two springs act upon the disc for its full range of operation and there is a continuous positive force tending to return the disc 21 to its normal position. After the springs are adjusted as above explained the pointer 25 is set to the zero point on the dial 6. If the pointer should vary from this position it can be returned by increasing or decreasing the compression of the springs. It should be noted here that when the base 50 is moved the stress in the two springs remains equally distributed and consequently the disc 21 moves approximately one-half the distance the base moves. This arrangement, therefore, provides a convenient adjustment and the adjustments so made do not alter the relationship of the springs and the bellows.

In operation the oil, or other fluid, enters the instrument through the pipe 14, passage 15, groove 16, screen 17, bore 18 and through hole 57 in block 50 into the bellows 20. The orifice 24 in the disc 23 is considerably smaller than the inlet passages just enumerated and a difference in pressure is, therefore, produced in the bellows 20. This pressure difference causes the disc 21 to move from its normal position and raise the shaft or push rod 26 a distance which is in direct proportion to this pressure. The movement of the rod 26 is transmitted through the crank 30, arm 34, link 35, gear segment 36, pinion 38 and shaft 39. The casing 5 is sealed against atmospheric pressure. Therefore the pressure difference between the inside of the bellows 20 and the inside of the casing 5 is due merely to the pressure drop corresponding to the flow through the orifice 24 and independent of the absolute pressure in the system. The oil which flows into the lower compartment of the casing 5 flows out through a pipe 58.

In the use of portable instruments of the type described, considerable difficulty is encountered in attempting to keep the oil off the instrument dial and outside of the indicator compartment. During operation the oil is pumped through the instrument by placing a suction pump on the outlet pipe. There is, therefore, no pressure built up in the lower compartment to force the oil upwardly along the surface of the shaft 26. When the instrument is being carried, however, or when it is laid on its side, there is a possibility of the oil flowing into the indicator compartment. To prevent this I provide a sleeve 59 which is secured to the under side of partition 27 and is concentric with the rod 26. This sleeve extends toward the disc 21 and its end limits the upward movement of the disc 21. The oil left in the instrument after use is only that which remains in the casing below the outlet pipe 58. If the instrument is laid on its side or even upside down this oil cannot flow into the indicator compartment since it will never reach the end of the sleeve 59. During operation, on the other hand, there is no opportunity for the oil to splash upwardly since the clearance between the shaft 26 and sleeve 59 is made only large enough to prevent any friction between the two members. In the present model of my instrument I use a separate instrument dial 6. It is, of course, possible to place the markings on the glass enclosure 10 of the casing. It is possible to place the markings on the outside of this glass dial and thereby avoid any difficulties in reading the dial should it become soiled irrespective of all the precautions taken.

What I claim as new and desire to secure by Letters Patent of the United States, is:—

In a flow meter, the combination of a casing provided with a partition dividing said casing into two chambers, an indicating mechanism in one of said chambers, an expansible walled casing in the second of said chambers, an outlet opening in said second chamber, an inlet opening in said expansible walled casing, said expansible walled casing having one end rigidly attached to the wall of said second chamber and having the other end provided with an orifice, said other end being movable in response to pressure differences built up by fluid flowing between said inlet and outlet openings through said orifice, means for transmitting the movement of said movable end to said indicating mechanism, means for adjusting the normal position of said movable end including a pair of springs mounted in said second chamber and said expansible walled casing, respectively, arranged to oppositely affect a movement of said end, means for adjusting said springs including a movable base for the spring in said expansible walled casing and means operable through the wall of said second chamber to move said base whereby the indicating mechanism may be set to its zero position.

GAYLORD H. WOTRING.